(12) United States Patent
Boukari et al.

(10) Patent No.: US 11,332,832 B2
(45) Date of Patent: May 17, 2022

(54) METHOD FOR THE MANAGEMENT OF FLUIDS REQUIRED FOR THE OPERATION OF A VEHICLE AND DEVICE MAKING IT POSSIBLE TO IMPLEMENT IT

(71) Applicants: Morou Boukari, Toulouse (FR); Marc Auriol, Bessieres (FR)

(72) Inventors: Morou Boukari, Toulouse (FR); Marc Auriol, Bessieres (FR)

( * ) Notice: Subject to any disclaimer, the term of this patent is extended or adjusted under 35 U.S.C. 154(b) by 304 days.

(21) Appl. No.: 16/363,389

(22) Filed: Mar. 25, 2019

(65) Prior Publication Data

US 2019/0284709 A1 Sep. 19, 2019

Related U.S. Application Data

(63) Continuation-in-part of application No. 14/811,512, filed on Jul. 28, 2015, now Pat. No. 10,240,241.

(60) Provisional application No. 62/031,681, filed on Jul. 31, 2014.

(51) Int. Cl.
   *C25B 1/02* (2006.01)
   *C25B 15/08* (2006.01)
   *B64D 47/00* (2006.01)
   *C25B 1/00* (2021.01)

(52) U.S. Cl.
   CPC ............... *C25B 1/02* (2013.01); *B64D 47/00* (2013.01); *C25B 1/00* (2013.01); *C25B 15/08* (2013.01)

(58) Field of Classification Search
   CPC .................................. C25B 1/02; C25B 15/08
   See application file for complete search history.

(56) References Cited

U.S. PATENT DOCUMENTS

| | | | | |
|---|---|---|---|---|
| 4,488,951 A * | 12/1984 | Nolan | .............. | C25B 9/73 |
| | | | | 205/629 |
| 5,384,208 A * | 1/1995 | Brand | ............... | H01M 8/0208 |
| | | | | 429/468 |
| 5,705,051 A | 1/1998 | Coin | | |
| 6,255,009 B1 | 7/2001 | Rusek | | |
| 10,240,241 B2 * | 3/2019 | Boukari | .............. | C25B 9/19 |
| 2002/0144898 A1 | 10/2002 | Laconti | | |
| 2002/0168558 A1 | 11/2002 | Griffen | | |
| 2007/0154748 A1 | 7/2007 | Okuyama | | |
| 2010/0032221 A1 | 2/2010 | Storey | | |
| 2011/0065016 A1 | 3/2011 | Sata | | |
| 2012/0315659 A1 | 12/2012 | Andreescu | | |
| 2016/0032463 A1 * | 2/2016 | Boukari | .............. | C25B 1/04 |
| | | | | 205/628 |

FOREIGN PATENT DOCUMENTS

WO 2005/050758 6/2005

OTHER PUBLICATIONS

Clement Vachey, Institut National de la Propriete Industrielle, Rapport de Recherche Preliminaire, FR 1457426, Mar. 30, 2015, pp. 1-2/.

* cited by examiner

*Primary Examiner* — Nicholas A Smith
(74) *Attorney, Agent, or Firm* — Nixon & Vanderhye

(57) ABSTRACT

Disclosed is a method for the management of fluids required to operate a fixed or mobile installation, the method including an operation of the anodic oxidation of a solution of hydrogen peroxide (P) for the purpose of producing oxygen, water and hydrogen cations by subjecting the solution to an electric current produced by an electrical power source. Also disclosed is a device that makes it possible to implement the method.

18 Claims, 7 Drawing Sheets

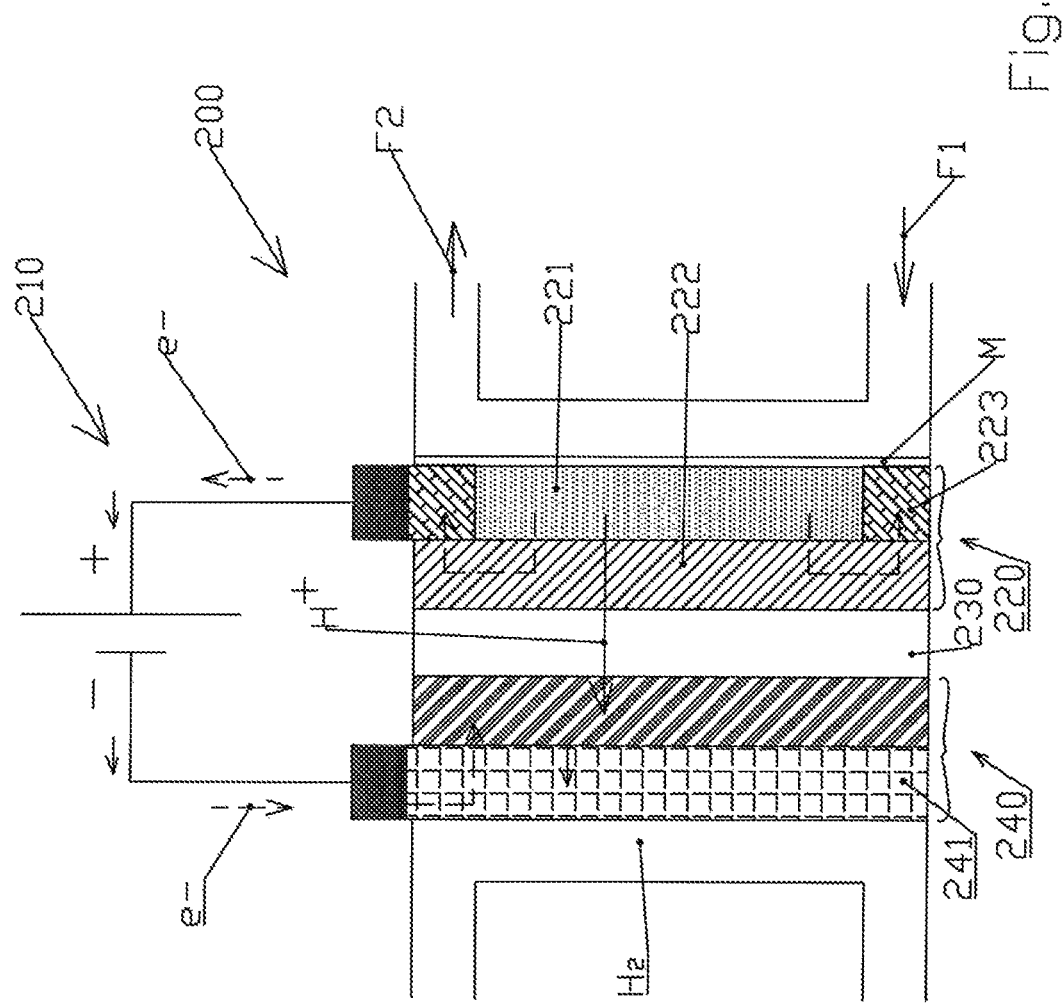

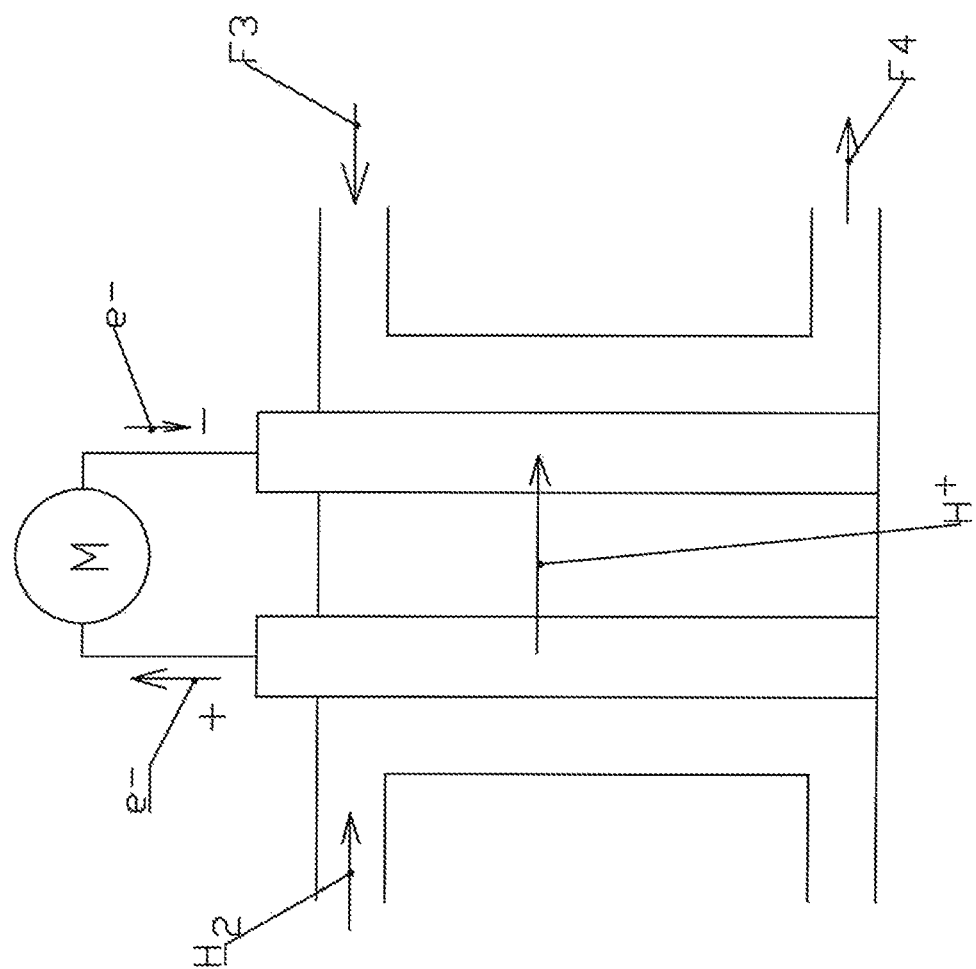

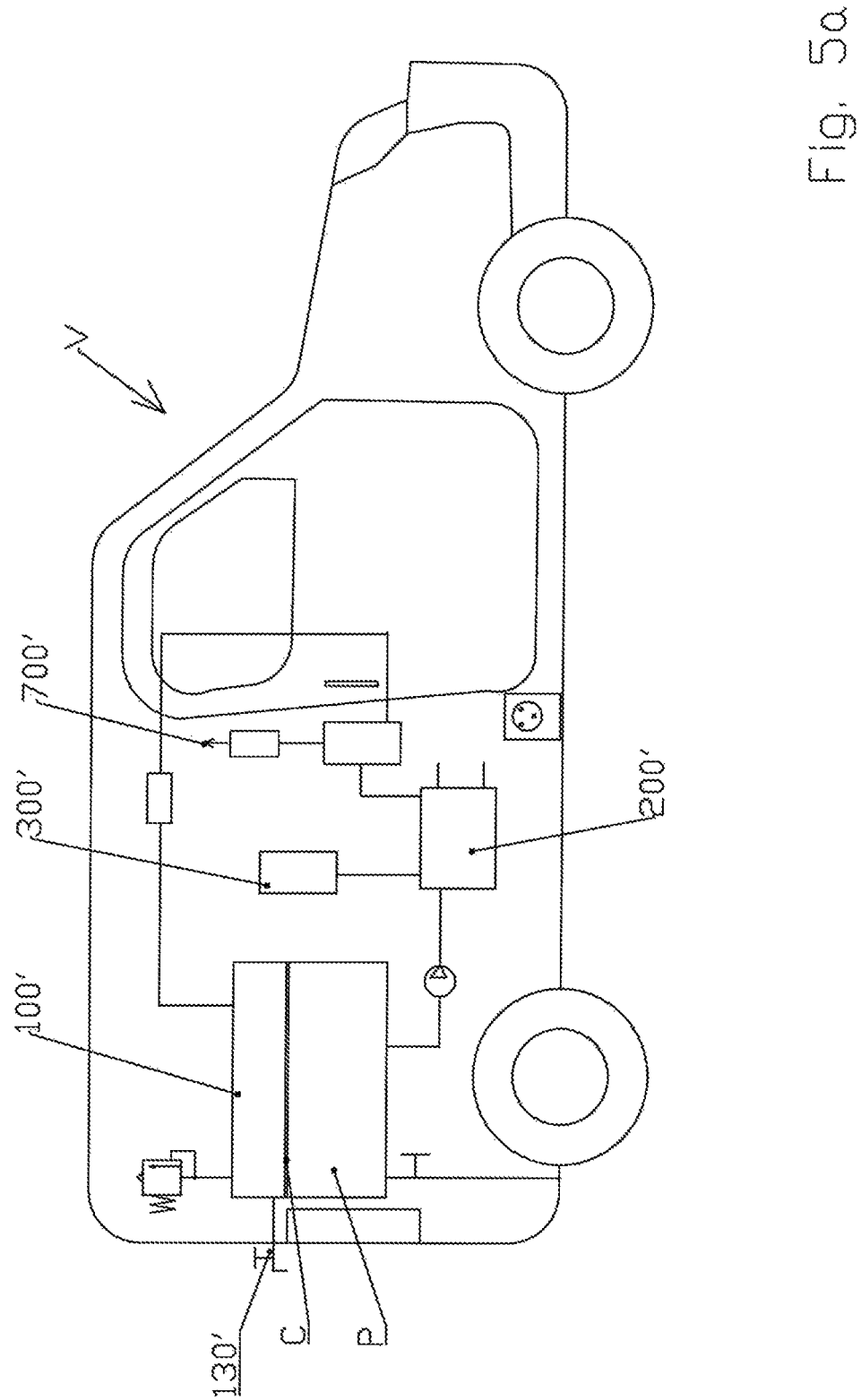

METHOD FOR THE MANAGEMENT OF FLUIDS REQUIRED FOR THE OPERATION OF A VEHICLE AND DEVICE MAKING IT POSSIBLE TO IMPLEMENT IT

FIELD OF APPLICATION OF THE INVENTION

This invention relates to the field of the management of fluids required to operate a fixed or mobile installation such as a vehicle such as an aircraft and in particular to the adaptations making it possible to supply, produce, store, consume, evacuate said fluids in the best conditions.

DESCRIPTION OF PRIOR ART

In the framework of the operation of a vehicle such as an aircraft, a plurality of fluids has to be managed by the operator.

As such, for example, it is necessary to supply pure oxygen to the passengers of an aircraft in particular in the event of a depressurisation of the cabin. This making available of oxygen is done for a limited number of minutes, the time to allow the aircraft to descend to an altitude that does not require pressurisation. The supplying of this oxygen requires storing it or the storing of the products that participate in producing it. This storage defines a space and a weight that requires the availability of a volume and a supply of energy for the aircraft.

Another fluid required for the operation of an aircraft carrying passengers is drinking water. This water is conventionally loaded on the ground which requires a substantial volume of storage and defines a weight that is also substantial. This storage therefore defines a space and a weight that consume energy at take-off and in flight. The procurement in water also comes up against the problems of the quality of the water which does not have the same criteria according to the country (having for example different proportions of bacteria and/or scale).

A scaling of the coffee-making devices can require the stoppage of the aircraft and a costly maintenance operation.

The possible presence of bacteria requires the water consumed to be treated. However, the known systems that use chlorine and/or the production of ultraviolet rays only have a relative degree of effectiveness. The storage and the distribution of water treatment products require a volume and energy that can have costs.

In addition, if good treatment of the water consumed can finally be achieved, the same does not apply to the pipes. Treating the drinking water network requires immobilising the aircraft and therefore has a cost for its operator.

Other fluids that may have to be managed in the framework of operating an aircraft as well as in that for a vehicle in general (in particular vehicles with wheels) are those required for the operation of a fuel cell. These devices produce electrical power as a substitute at least partially for batteries. These devices have the advantage of having a better output than that of batteries while still not producing nitrogen or carbon monoxide. These devices also have for advantage to allow for the production of water.

However, these devices also have several disadvantages of which those recalled hereinbelow:

they can release a substantial amount of heat,
fuel cells that operate with hydrogen require the storage of the latter either filled when the aircraft is on the ground, or produced in flight by water electrolysis which requires more power than a fuel cell can produce;

Fuel cells that operate with oxygen require the latter to be stored;

The water, which is produced only in a small (insufficient) quantity, requires remineralisation before it is consumed which requires an additional device;

The reversibility of such devices consumes more power than they produce, etc.

In order to resolve the problems of overvoltage and of the production of heat and in order to be released from the constraint of the presence of oxygen, it is known to use hydrogen peroxide as a substitute by carrying out the reduction of the peroxide into hydroxide $OH^-$ ion.

However, reducing the peroxide does not solve all of the problems with respect to the fuel cell or with respect to the management of the other fluids.

DESCRIPTION OF THE INVENTION

Observing this, the applicant carried out research aimed at providing a solution to the disadvantages described hereinabove. This research resulted in the designing and the carrying out of a method for the management of fluids required for the operation of a vehicle not only of the aircraft type but also any type of vehicle that uses electricity. The applicant also sought to apply this research to other installations such as fixed installations that use the same fluids.

According to the main characteristic of the invention, the method for the management of fluids required to operate a fixed or mobile installation, is remarkable in that it comprises an operation of the anodic oxidation of a solution of hydrogen peroxide for the purpose of producing oxygen, water and hydrogen cations by subjecting said solution to an electric current produced by an electrical power source.

This characteristic is particularly advantageous in that it makes it possible, based on a single fluid subjected to an electric current, to have via a single operation of oxidation at least two fluids required (or able to be required) for the operation of a fixed installation such as a hydrogen refill terminal or mobile such as a vehicle such as an aircraft.

As such, the anodic oxidation of a solution of hydrogen peroxide leads to the obtaining of the following elements:

oxygen $O_2$ coming from the separation of the molecule of oxygen from that of dihydrogen burst into two hydrogen ions, a remainder of hydrogen peroxide $H_2O_2$ not broken down,
water $H_2O$ coming from the solution.

The circulation of the water coming from the solution makes it possible to remove the heat from the reaction. The hydrogen cations are not used in this first phase.

The oxygen produced will make it possible to propose the making available of this gas for the installation. As such, it appears that the oxygen will be able to be produced on demand and in a large quantity. This production of oxygen is combined with the decrease in the concentration of hydrogen peroxide in the water solution, which makes it possible to have a large volume of water. This water is therefore once mineralised not only drinkable but also treated due to the biocide properties of the remainder of peroxide.

The production of a treated water resolves the various problems linked to its quality and to the maintaining of the drinking water network of the installation.

This characteristic as such defines a phase of the method which comprises an operation of filling with a solution of hydrogen peroxide a tank carried by the vehicle. The concentration of hydrogen peroxide in the solution is according to a particularly advantageous characteristic of the invention, between ten and seventy percent.

According to a particularly original phase of the method, the latter comprises an operation of filling the drinking water tank provided on the installation with a solution of hydrogen peroxide. As such, the solution of hydrogen peroxide is stored in a volume replacing that of the oxygen but also that of the drinking water. Said tank receiving the hydrogen peroxide is then provided with a safety valve.

Said tank can also be rendered passive or be manufactured from aluminium in order to prevent the disproportionation described hereinabove.

According to a particularly advantageous embodiment that avoids having to replace stainless steel tanks and pipes already available on an installation such as an aircraft, the solution of hydrogen peroxide is stabilised by adding metal sequestering agents at the trace state (very small quantity).

The space and weight saved are substantial and satisfy the objectives of the invention.

According to another characteristic, the method consists in mineralising the solution of hydrogen peroxide, which avoids the need for a remineralisation cell or makes it possible to undersize it.

The electrical power of the electrical power source required for the anodic oxidation of the hydrogen peroxide comes from batteries or excess electricity of the installation for example that available during takeoff and during the flight at a cruising speed of the aircraft when the installation is a mobile installation such as an aircraft.

The supply with electricity can be carried out through various solutions in particular by solar panels.

As such, based on the single solution of hydrogen peroxide, the invention proposes the production of two fluids required for the operation of a mobile installation such as an aircraft, namely oxygen and water.

This anodic oxidation is differentiated from the disproportionation known for the peroxide which does not produce hydrogen ions $H^+$.

According to another characteristic of the invention, the method comprises an operation of the cathodic reduction of the hydrogen cations coming from said operation of anodic oxidation for the purpose of producing dihydrogen.

This first phase of the method further comprises an operation of storing the hydrogen produced. This storage is carried out in the installation. This hydrogen will be able to be used in the framework of a second phase of producing electricity still by using the same solution of hydrogen peroxide stored, not as a reducer but as an oxidant in order to form a fuel cell. As such, according to another particularly advantageous characteristic, the method comprises an operation of oxidation of the hydrogen produced combined with an operation of reducing the hydrogen peroxide for the purpose of producing electricity and water. The quantity of electricity produced is greater than that required for the anodic oxidation.

This fuel cell can be implemented by an independent cell or by the inversion of the cell that produced the hydrogen. As such, the method of the invention proposes in addition to producing oxygen and water, to provide for the production of the electricity required for the operation of the installation at least partially. The carrying of the solution of hydrogen peroxide in an installation such as an aircraft thus becomes a global solution to the problem of storage, weight and production of power for the aircraft.

As explained hereinabove, the use of hydrogen peroxide makes it possible to produce in a first phase the hydrogen required in a second phase for the production of electricity.

These two steps can be applied to any installation that is able to have its peroxide tank supplied on a regular basis. Indeed, the power required to produce hydrogen using hydrogen peroxide is less than the power produced by a fuel cell using the hydrogen/hydrogen peroxide pair. Such an installation would then have a substantial degree of autonomy without producing any exhaust gas other than water vapour which itself can be recovered. Such a method comprises an operation of neutralising the peroxide still present in the water. This recovered water could return to the volume of initial storage compartmented for this purpose. However, the question then arises of the implementing of the compartmentalisation or that of the concentration of hydrogen peroxide in the solution which must be sufficient in order to allow for effective production. For this purpose, according to a particularly advantageous characteristics of the invention, the method comprises an operation of pre-concentrating the hydrogen peroxide solutions before the anodic oxidation operation which will make it possible to operate the cell regardless of the concentration in hydrogen peroxide.

In order to suppress any impurities present in the oxygen obtained, the method comprises an operation of treating the oxygen produced.

In addition, if the method comprises an operation of remineralising the water produced, the latter is not as substantial than if the water had only come from a cell of the fuel cell type since in the first phase of the method, according to a characteristic described hereinabove, the water of the peroxide solution is mineralised.

The invention also relates to the device that makes it possible to implement the invention.

For example, the device comprises an oxidation cell that, comprising said electrical power source, is provided with an anode wherein said oxidation takes place and with a cathode separated by a cationic membrane that allows only $H^+$ ions to pass, with the positive pole of the source of power being connected to the anode.

This characteristic avoids polluting the cathode by the presence of other ions coming from the minerals contained according to a characteristic described hereinabove in the solution of hydrogen peroxide.

More precisely, this cell comprises one or several membranes of the cationic type separating two electrodes:
 a cathode connected to the − pole,
 an anode connected to the + pole of a generator.

According to another particularly advantageous characteristic of the device, said anode comprises several layers:
 a first porous layer containing a catalyst for producing the anodic oxidation e electrons,
 a second porous layer containing a catalyst for capturing anodic oxidation electrons, and
 a non-porous electrical conductor electrically insulated on the face in contact with the first layer and on the face in contact with the hydrogen peroxide.

As such, the anode of the oxidation cell contains catalysts that are specific to the acceleration of the anodic oxidation allowing for a fast transfer of the ions and of the electrons. These catalysts can be on several layers.

According to a preferred but not limited embodiment, the anode can contain a porous membrane made of gold or supported by a porous membrane made of platinum.

According to a possible implementation of the compartmentalisation, the device comprises, according to another particularly advantageous characteristics of the invention, a tank that is compartmented by a deformable wall into a lower volume and into an upper volume, with the lower volume receiving a solution of hydrogen peroxide, with upper volume receiving the water produced by the anodic oxidation operation.

Thus, when one of the liquids loses volume, the other liquid takes it on without the total volume of the tank changing.

The various elements are arranged in such a way that the volume of water bears down on the volume of peroxide and ensures the exiting thereof and the supply of the cell. Thus, the weight of the water is taken advantage of.

The wall can be partially or entirely flexible. It is hydrogen peroxide resistant and prevents the catalytic decomposition of said peroxide.

According to another particularly advantageous characteristic of the invention, the device is remarkable in that it comprises for the hydrogen peroxide, a tank made of one of the following materials:
stainless steel,
aluminium,
carbon fibre,
composite material,
plastic.

According to another particularly advantageous characteristic of the invention, the device is remarkable in that the electrode with which the peroxide solution comes into contact in the cell is covered with a membrane that has the following characteristics:
permeable to the molecule of hydrogen peroxide,
impermeable to water,
permeable to ions.

Such a characteristic allows for the use of a solution containing peroxide regardless of the concentration. It further makes it possible to consider the return of the water produced by the cell into the tank containing the solution of peroxide without influencing the output.

According to another particularly advantageous characteristic of the invention, the device comprises a separate tank for storing the oxygen produced.

According to another particularly advantageous characteristic of the invention, the device comprises a separate tank for storing the hydrogen produced.

The fundamental concepts of the invention now exposed hereinabove in their most basic form, other details and characteristics shall appear more clearly when reading the following description and with respect to the annexed drawings, provided as a non-restricted example, an embodiment of a method and of a device in accordance with the invention.

BRIEF DESCRIPTION OF THE DRAWINGS

FIG. 3*a* corresponds to the embodiment of FIG. 3 with a pre-concentration membrane associated with the anode;

FIG. 4 is a detailed diagrammatical drawing of an embodiment of the fuel cell used for the second phase of the method;

FIG. 5*a* corresponds to the embodiment of FIG. 5 with a flexible membrane that compartmentalises the tank of peroxide.

DESCRIPTION OF PREFERRED EMBODIMENTS

Figure 1:
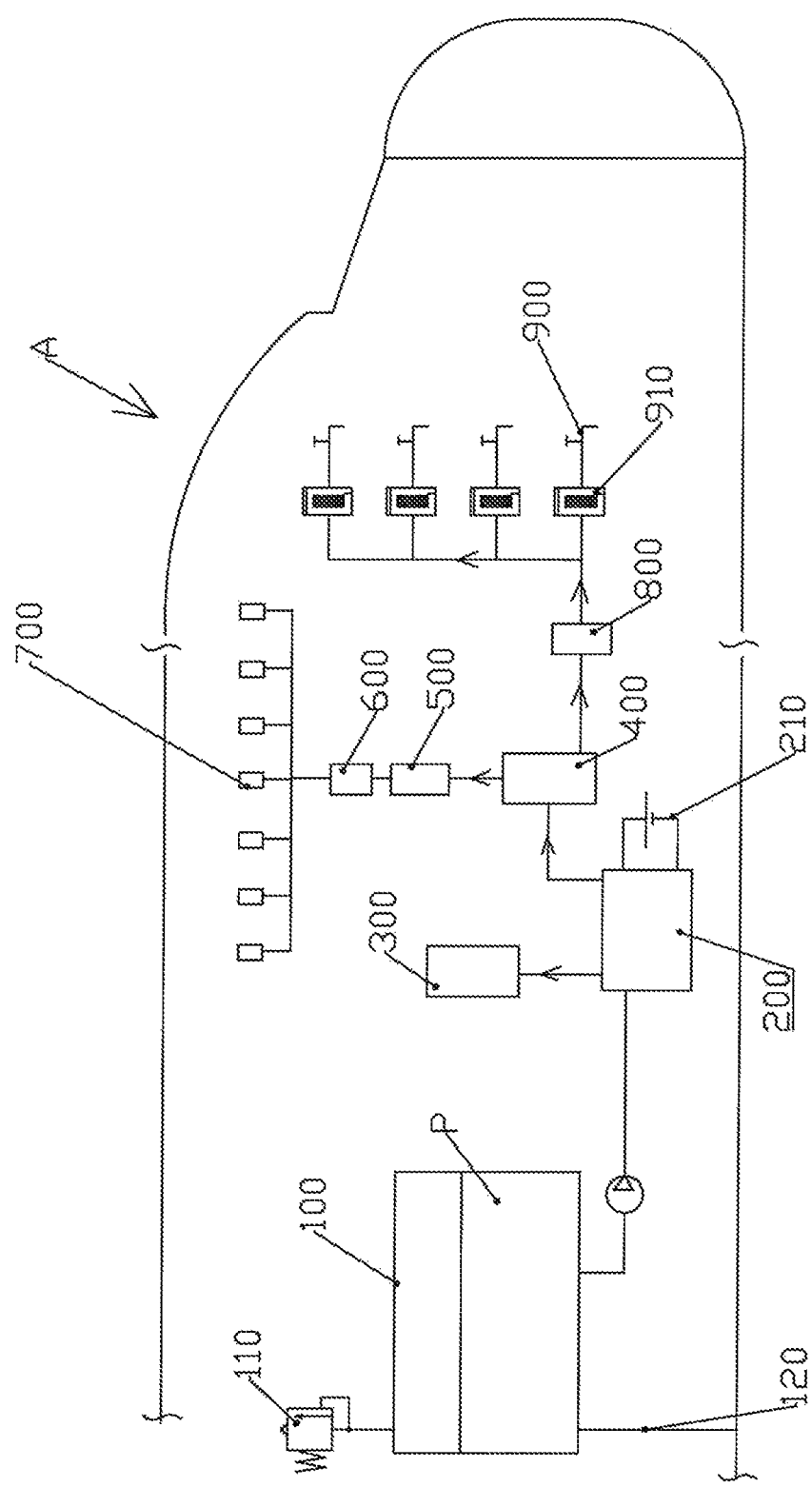
FIG. 1 is a diagrammatical drawing of an embodiment of an implementation aboard an aircraft of the first phase of the method of the invention.

As shown in the drawing of FIG. 1, the aircraft A is provided with a device that makes it possible to implement the method of the invention.

This device comprises a tank 100 wherein is stored hydrogen peroxide P. This tank 100 comprises a safety valve 110 as well as a conduit 120 allowing it to be filled from the outside. Another conduit 130 makes it possible by using a pump 140, to convey said peroxide into an anodic oxidation cell 200 which is associated with an electrical power source 210.

Figure 3:
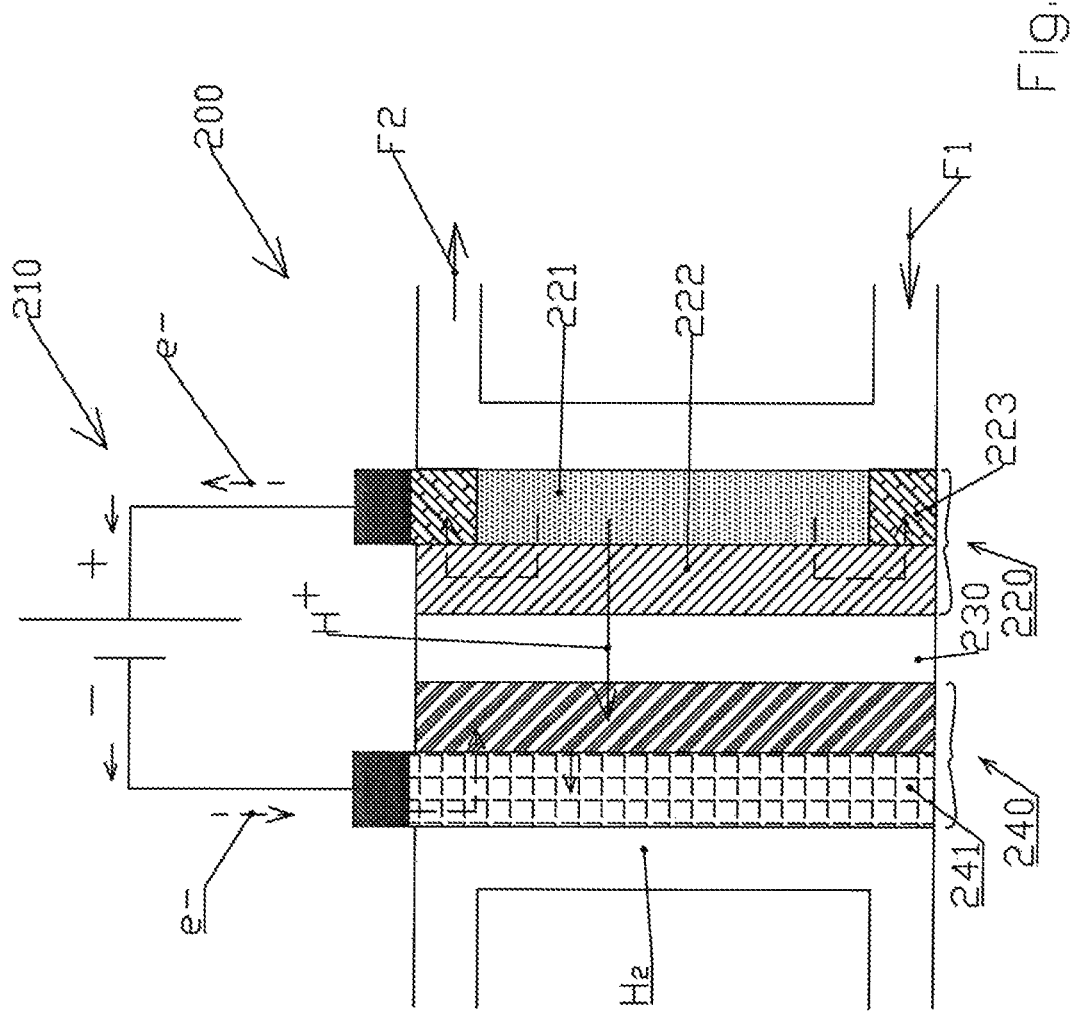
FIG. 3 is a detailed diagrammatical drawing of an embodiment of the anodic oxidation cell used for the first phase of the method.

As shown in FIG. 3, the electrical actuation makes it possible using peroxide $H_2O_2$ (solution of hydrogen peroxide containing $H_2O_2$ and $H_2O$ symbolised by the arrow F1) to obtain hydrogen ions $H^+$ from the electrons $e^-$ and oxygen $O_2$ according to the following reaction:

$$H_2O_2 \rightarrow 2H^+ + 2e^- O_2$$

The results of this reaction are oxygen $O_2$, water $H_2O$ coming from the peroxide solution and hydrogen peroxide $H_2O_2$ that was not oxidised and therefore at a lower concentration. This result is symbolised by the arrow F2.

The anodic oxidation is obtained by means of a particular anode 220 that has several layers, among these:
a first porous layer 221 containing a catalyst for producing anodic oxidation e electrons,
a second porous layer 222 containing a catalyst for capturing anodic oxidation electrons.

The anode also comprises a non-porous electrical conductor insulated electrically on the face in contact with the first layer and on the face in contact with the hydrogen peroxide.

In addition, the face in contact with the hydrogen peroxide is treated in order to prevent the parasitic breaking down of the latter.

The first layer and the second layer form a catalytic dipole. The materials of these layers are chosen in such a way that in the absence of a connection of the cell to an electric generator, the electric potential of the first layer is less than that of the second layer. The catalytic dipole formed as such has an electric potential between that of the first layer and that of the second layer.

The electrical voltage required for this oxidation is advantageously less than the electrolysis voltage, which avoids this latter reaction from having to intervene.

According to a non-restricted embodiment, these two layers can be comprised of metal materials from the platinum, gold, ruthenium, rhodium, palladium, silver, nickel cobalt family.

A cationic membrane 230 separates the anode 220 from the cathode 240. According to an embodiment linked to the embodiment describing a mineralised solution of peroxide, this membrane only allows the $H^+$ cations to pass.

The hydrogen ions associated with electrons make it possible to obtain atoms of hydrogen or dihydrogen $H_2$ on the cathode 240 where the reducing of the $H^+$ cations into dihydrogen $H_2$ is carried out. To do this, the cathode has a porous electrical conductor 241.

The embodiment of FIG. 3a differs from that of FIG. 3 only in that a pre-concentration membrane M is associated with the anode 220. This membrane implements a pre-concentration operation before the anodic oxidation operation. Thus, the cell operates regardless of the concentration in hydrogen peroxide of the solution.

As shown in the drawing of FIG. 1, the hydrogen produced is stored in a tank 300 and the oxygen, the water and the remainder of hydrogen peroxide are directed to a recovery cell 400.

This recovery cell 400 directs the oxygen to a treatment unit 500 and to a tank 600 for storing the oxygen treated. This oxygen storage tank 600 is connected to the oxygen masks 700 of the aircraft.

The water and the remainder of hydrogen peroxide are directed to a remineralisation cell 800 which corrects the mineralisation of the water that is going to pass through the filters 910 that are associated and placed upstream of the valves 900 of the drinking water network of the aircraft.

These filters 910 provide for the destruction of the hydrogen peroxide.

It appears that the first phase of the method makes it possible to have oxygen as desired by electrically powering the cell 200. It also appears that it is no longer necessary to have a tank of drinking water since the solution of peroxide cleared of its peroxide will be used as drinking water once it is remineralised. In addition, the remainder of unoxidized peroxide is neutralised only at the end of the network, which makes it possible to benefit from the biocide characteristics of the hydrogen peroxide which will optimise the treatment of the network by preventing the presence of bacteria.

The second phase of the method is a phase of producing power by a fuel cell principle by using the hydrogen produced as a reducer and the hydrogen peroxide stored in the tank 100 as an oxidant.

Figure 2:
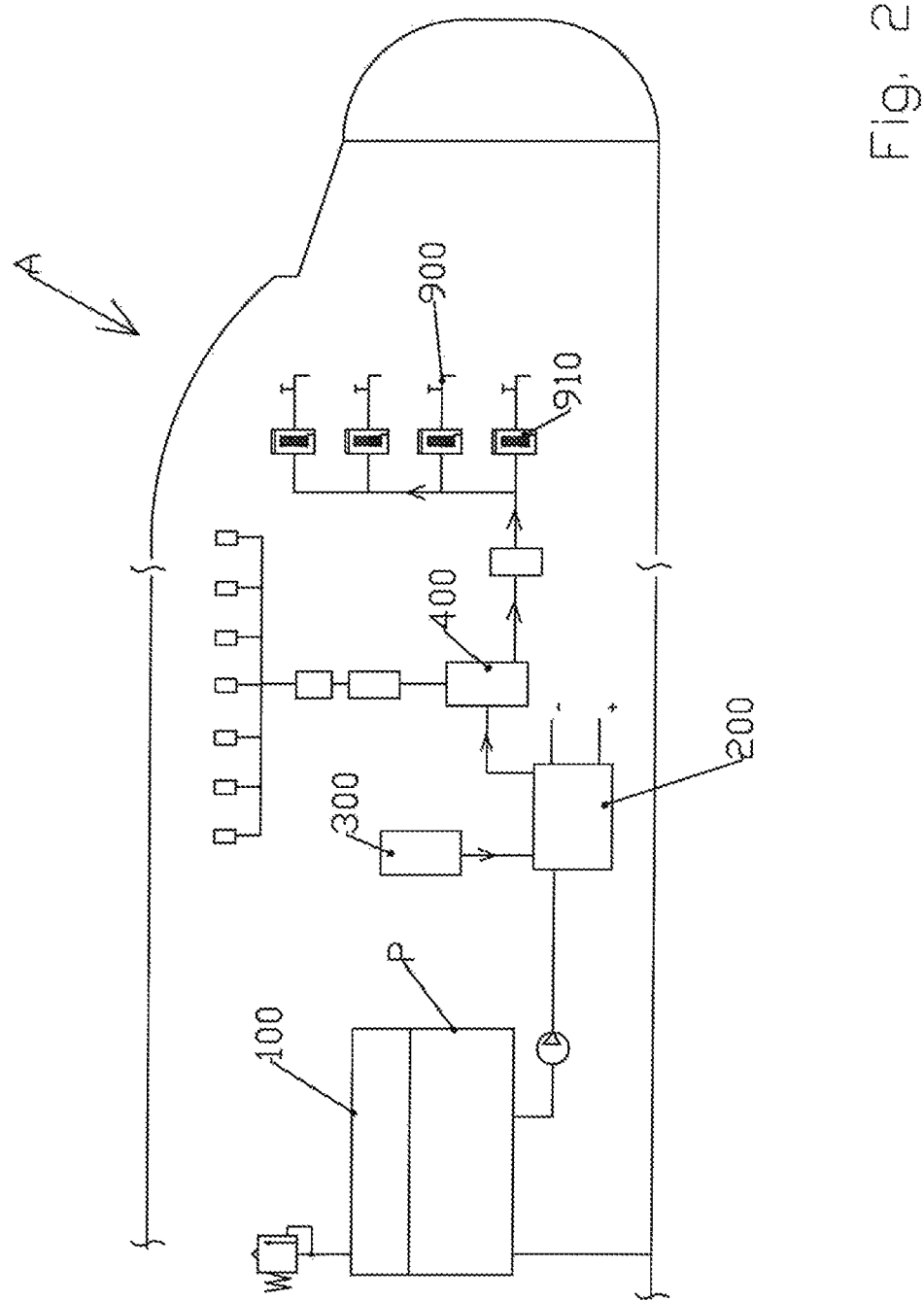
FIG. 2 is the diagrammatical drawing of FIG. 1 showing an embodiment of an implementation of the second phase of the method of the invention.

As such, as shown in the drawing of FIG. 2, the solution of hydrogen peroxide P stored in the tank 100 is conveyed to the cell 200 which is then a reversible cell or an independent cell and which behaves as a fuel cell such as shown by the diagram of FIG. 4 where the arrow F3 symbolises the $H_2O_2$ and $H_2O$ solution.

The oxidation of the dihydrogen and the reduction of the hydrogen peroxide allow for the creation of an electrical current coming from the following reactions:

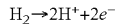

$$H_2 \rightarrow 2H^+ + 2e^-$$

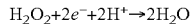

$$H_2O_2 + 2e^- + 2H^+ \rightarrow 2H_2O$$

As described hereinabove the fuel cell also produces water. The arrow F4 therefore symbolises this solution containing a remainder of peroxide i.e. $H_2O_2$ (at a lower concentration) and $H_2O$. This water once remineralised associated with the water of the solution supplies the valves 900. In addition, as with the supply phase, the remainder of peroxide that was not reduced is neutralised upstream of valves 900.

It appears as such that the second phase of the method allows for the production of electricity in the aircraft A.

As an example, the anodic oxidation voltage of the hydrogen peroxide can be 0.8 volt and the voltage of the fuel cell of the invention can be 1.8 volts.

Figure 5:
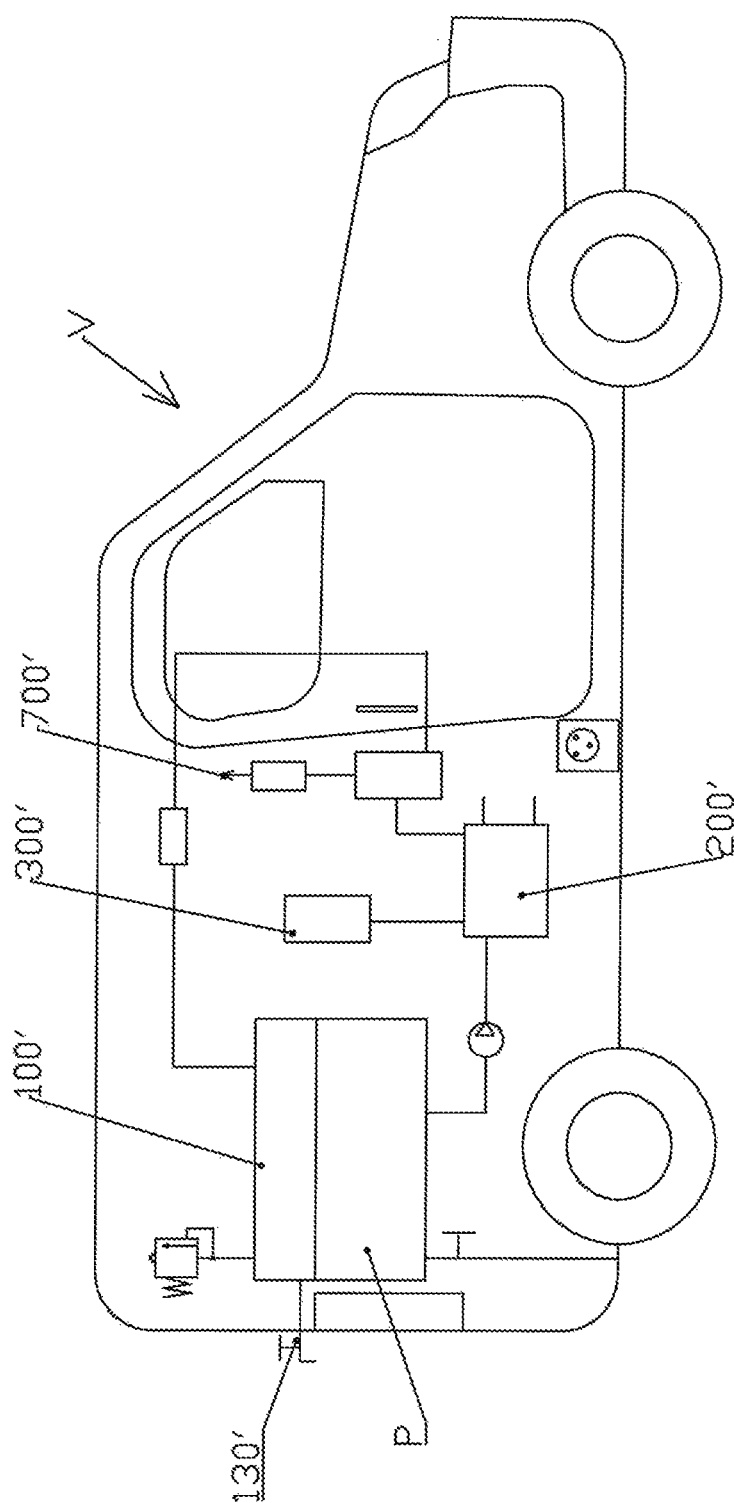
FIG. 5 is a diagrammatical drawing showing an embodiment of a circuit implementing the two phases of the method for a land vehicle.

The drawing of FIG. 5 shows a vehicle V receiving an embodiment of a device implementing the method of the invention. The tank 100' is filled with hydrogen peroxide P.

For such an application, the first phase of the method is above all used to produce the hydrogen that will be stored in the tank 300'. Indeed, the water coming from the solution is not as useful but could be useful for a vehicle carrying many passengers over a long distance. In addition, the oxygen can be partially introduced into the passenger compartment by means of a mouth 700'.

The hydrogen produced will allow for the implementation of the fuel cell 200' in association with the hydrogen peroxide. The electricity produced allows for the supplying of the means of motorisation of the vehicle V.

The water produced by the first and the second phase of the method is neutralised and returned to the tank 100' which is compartmentalised for this purpose. A drain valve 130' is associated to this compartment.

The embodiment of FIG. 5a differs from that of FIG. 5 only in that a deformable wall or flexible membrane of compartmentalisation C separates the bottom of the tank where the peroxide solution is located from the top of the tank that receives the water produced. Under the effect of the weight of the water, the peroxide solution exits from the tank.

It is understood that the method and the device, which have just been described and shown hereinabove, were described and shown for the purposes of a disclosure rather than a limitation. Of course, various arrangements, modifications and improvements can be made to the example hereinabove, without however leaving the scope of the invention.

The invention claimed is:

1. A method of managing fluids required to operate a fixed or mobile installation, the method comprising:
   pre-concentrating a hydrogen peroxide solution, prior to an anodic oxidation of the hydrogen peroxide solution by contact between the hydrogen peroxide solution and an anode, wherein the anode is covered by a membrane that is permeable to hydrogen peroxide, impermeable to water, and permeable to ions;
   anodic oxidation of the pre-concentrated hydrogen peroxide solution for the purpose of producing oxygen, water, and hydrogen cations by subjecting the solution to an electric current produced by an electrical power source; and
   cathodic reduction of the hydrogen cations coming from the anodic oxidation for the purpose of producing dihydrogen.

2. The method according to claim 1, further comprising filling with the hydrogen peroxide solution a tank provided on the fixed or mobile installation.

3. The method according to claim 1, further comprising storing the dihydrogen produced.

4. The method according to claim 1, further comprising oxidising the dihydrogen produced combined with reducing the hydrogen peroxide for the purpose of producing electricity and water.

5. The method according to claim 1, further comprising treating the oxygen produced.

6. The method according to claim 1, further comprising remineralising the water produced.

7. The method according to claim 1, further comprising neutralising hydrogen peroxide still present in the water.

8. The method according to claim 1 wherein the fixed or mobile installation comprises a drinking water tank, further comprising filling the drinking water tank with a solution of hydrogen peroxide.

9. The method according to claim 1 wherein the installation is an aircraft, wherein the electrical power required for the anodic oxidation of the hydrogen peroxide comes from the electricity produced during the take-off of the aircraft or during the flight at the cruising speed of the aircraft.

10. The method according to claim 1, wherein the water of the hydrogen peroxide solution is mineralised.

11. The method according to claim 1, wherein the hydrogen peroxide in the solution is between ten and seventy percent.

12. The method of claim 1 wherein the hydrogen peroxide solution is stabilized by adding trace amounts of a metal sequestering agent.

13. A device making it possible to implement the method according to claim 1, comprising an oxidation cell that, comprising said source of electrical power, is provided with the anode wherein said oxidation takes place and a cathode separated by a cationic membrane that allows only the $H^+$ ions to pass, with the positive pole of the source of power being connected to the anode.

14. The device according to claim 13, wherein said anode comprises several layers:
- a first porous layer containing a catalyst for producing anodic oxidation ($e^-$) electrons,
- a second porous layer containing a catalyst for capturing anodic oxidation electrons ($e^-$), and
- a non-porous electrical conductor electrically insulated on the face in contact with the first layer and on the face in contact with the hydrogen peroxide.

15. A device making it possible to implement the method according to claim 13, comprising a tank compartmented by a deformable wall into a lower and into an upper volume, with the lower volume receiving a solution of hydrogen peroxide, with the upper volume receiving the water produced by the anodic oxidation operation.

16. A device making it possible to implement the method according to claim 13, comprising for the hydrogen peroxide, a tank made of one of the following materials:
stainless steel,
aluminium,
carbon fibre,
composite material,
plastic.

17. The device according to claim 13, further comprising a separate tank for storing the oxygen produced.

18. The device according to claim 13, further comprising a separate tank for storing the hydrogen produced.

* * * * *